(12) United States Patent
Manaresi et al.

(10) Patent No.: US 6,256,022 B1
(45) Date of Patent: Jul. 3, 2001

(54) LOW-COST SEMICONDUCTOR USER INPUT DEVICE

(75) Inventors: Nicolo' Manaresi; Roberto Rambaldi, both of Bologna; Marco Tartagni, Meldola; Zsolt Miklos Kovaks-Vajna, Bologna, all of (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/187,797

(22) Filed: Nov. 6, 1998

(51) Int. Cl.[7] .................................................. G09G 5/00
(52) U.S. Cl. ....................... 345/174; 382/124; 178/18.06
(58) Field of Search ................................ 345/173, 156, 345/174, 175; 382/315, 124, 125; 178/18.01, 18.03, 18.05, 18.06, 18.07, 19.01, 19.03; 463/37

(56) References Cited

U.S. PATENT DOCUMENTS

| | | |
|---|---|---|
| 4,353,056 | 10/1982 | Tsikos . |
| 4,477,797 * | 10/1984 | Nakagiri .................................. 341/5 |
| 5,325,442 | 6/1994 | Knapp . |
| 5,463,388 | 10/1995 | Boie et al. . |
| 5,488,204 | 1/1996 | Mead et al. . |
| 5,543,591 | 8/1996 | Gillespie et al. . |
| 5,548,394 * | 8/1996 | Giles et al. ............................. 356/71 |
| 5,578,817 * | 11/1996 | Bidiville et al. ...................... 250/221 |
| 5,801,681 * | 9/1998 | Sayag .................................... 345/157 |
| 5,825,352 | 10/1998 | Bisset et al. . |
| 5,852,670 * | 12/1998 | Setlak et al. .......................... 382/126 |
| 5,864,296 * | 1/1999 | Upton ................................. 340/825.3 |
| 5,943,043 | 8/1999 | Furuhata et al. . |
| 5,963,679 * | 10/1999 | Setlak .................................... 382/312 |
| 5,974,162 * | 10/1999 | Metz et al. ............................ 382/124 |
| 6,037,882 | 3/2000 | Levy . |

* cited by examiner

Primary Examiner—Bipin Shalwala
Assistant Examiner—Ricardo Osorio
(74) Attorney, Agent, or Firm—Thompson & Knight L.L.P.

(57) ABSTRACT

A low-cost semiconductor user input device for controlling the position of a pointer on a display includes a small array of composite sensors. Each composite sensor of the array is adapted to detect movement of a fingerprint feature. The user input device moves the pointer based upon the net movement detected by the composite sensors of the array.

15 Claims, 3 Drawing Sheets

LOW-COST SEMICONDUCTOR USER INPUT DEVICE

FIELD OF THE INVENTION

The present invention relates generally to systems for providing user input to user interfaces for computers and the like, and more particularly to a semiconductor capacitive user input device and method for controlling the position of a cursor or pointer on a display.

DESCRIPTION OF THE PRIOR ART

Pointing devices are commonly used in conjunction with computers to control the movement of graphical cursors or pointers on display screens and to select objects and operate controls displayed on the screen. For desktop computers and work stations, the most commonly used pointing device is a mouse. As is well known, a mouse is moved over a flat surface to control the position of the pointer on the display screen. The mouse includes one or more buttons that may be pressed or clicked to perform operations on objects and controls displayed on the screen.

Recently, small laptop and notebook computers have become very popular. Laptop and notebook computers may be used in conjunction with a docking station so that a standard keyboard, mouse, and CRT display may be used for the user interface. However, laptop and notebook computers are designed to be used while traveling away from the office or home. In such remote locations, the user does not always have available a flat surface upon which to use a mouse. Accordingly, laptop and notebook computers typically have a built-in pointing device, such as a track ball, touchpad, or a pressure-actuated pointer device, such as the IBM TrackPoint(™) device.

In addition to computers, certain television and set top box systems include a graphical user interface for enabling a user to input information to the system and change or control system settings. The user input device for such systems is typically a hand-held infrared keypad controller. Such controllers may include devices similar to those used in laptop and notebook computers to control the position of a pointer on the television screen. Trackballs, touchpads, and pressure-actuated pointing devices have certain drawbacks. For example, while trackballs are compact, they require consider finger movement to produce large pointer displacements at low velocities. In addition, trackballs are mechanical devices that may not be well suited for operation in dirty environments.

A touchpad comprises a rectangular surface that is mapped to correspond to a display screen. By touching the location on the touchpad, the user causes the computer to move the pointer to the corresponding location on the screen. Since a typical touchpad is substantially smaller than the screen, accurate positioning of the pointer can be difficult. In order to be useable, a touchpad must be large enough to permit the user to position the pointer accurately. The large size of touchpads makes them relatively expensive.

Pressure-actuated pointing devices include strain gauges or transducers that detect the direction and magnitude of the force of the user's finger on the device. The pointer is moved in a direction corresponding to the direction of the force and to the speed corresponding to the magnitude of the force. Certain individuals have trouble using pressure-actuated pointing devices to position the pointer accurately on the screen. One source of trouble is inertia, whereby the pointer continues to move after the user releases the pressure on the device.

In U.S. application Ser. No. 09/012,065, filed Jan. 22, 1998, by A. Ferrari and M. Tartagni, entitled "Touchpad Providing Screen Cursor/Pointer Movement Control", there is disclosed a touchpad device that includes a matrix array of capacitance sensors. The array of the invention can be used initially to acquire a user fingerprint for use in a user identification procedure that occurs during logon to a device such as a laptop or palmtop computer. Subsequently, the array is used to provide user input to the computer. By using the array both for user identification and for user input, the cost of the relatively large array is justified.

In U.S. application Ser. No. 09/006,691, filed Jan. 13, 1998, by Alan Kramer, entitled "Capacitive Semiconductor User Input Device", there is disclosed a device for providing user input to a computer, or the like, by detecting changes in a fingerprint pattern of a user. The device of application Ser. No. 09/006,691 captures successive images of the fingerprint ridges and pores. The device captures the successive images by scanning an array of sensors, each of the sensors being smaller than the width of an individual ridge of a fingerprint. The array of sensors is substantially smaller than the pad of a finger of a user. The device detects motion of the ridges and pores by comparing the captured successive images.

Since the array of the device of application Ser. No. 09/006,691 is relatively small, it is substantially less expensive to make than a touchpad device. However, capturing and comparing successive images to determine motion is a complex task requiring substantial computer processing. It is therefore an object of the present invention to provide a user input device that overcomes the shortcomings of the prior art.

SUMMARY OF THE INVENTION

The present invention provides a low-cost semiconductor user input device for controlling the position of a pointer on a display. The user input device of the present invention includes a small array of composite sensors. Each composite sensor of the array is adapted to detect movement of a fingerprint feature. The user input device of the present invention moves the pointer based upon the net movement detected by the composite sensors of the array.

Each composite sensor of the present invention includes a central trigger sensor, a pair of X direction sensors disposed on opposite sides of said trigger sensor, and a pair of Y direction sensors disposed on opposite sides of said trigger sensor. Each sensor of each composite sensor is adapted to produce a voltage indicative of the presence of a fingerprint feature in proximity thereto. A fingerprint valley produces a first voltage and fingerprint ridge produces a second voltage.

The user input device detects movement of fingerprint features by detecting transitions from the first voltage to the second voltage at the sensors. A transition detected at a central trigger sensor followed by a transition detected at one of the X or Y sensors indicates movement in the X or Y direction. The movement indicated by each composite sensor is processed to determine the net movement of the fingerprint features and to move the pointer accordingly.

In one of its aspects, the user input device includes averaging circuitry connected in parallel to each sensor of a composite sensor. The averaging circuitry determines the average voltage produced by the sensors of the composite sensor. A comparator is associated with each sensor of the composite sensor. The comparator is connected to its associated sensor and to said averaging circuitry. Each comparator outputs a first value when the sensor to which it is connected produces a voltage less than the average voltage and a second value when the sensor to which it is connected outputs a voltage greater than the average voltage.

The comparators associated with the sensors of each composite sensor are connected to a finite state machine. The finite state machine normally outputs a zero value. The finite state machine is set when the comparator connected to the central trigger sensor makes a transition from the first value to the second value. The finite state machine outputs a plus or minus one value a comparator connected to one of the X or Y sensors makes a transition from the first value to second value while the finite state machine is set. The sign of the output is determined by the position of the sensor making the transition with respect to the trigger sensor. A motion sensor sums the outputs of the finite state machines to determine the magnitude and direction of movement of the fingerprint features over the array of composite sensors.

DESCRIPTION OF THE PREFERRED EMBODIMENT

Figure 1:
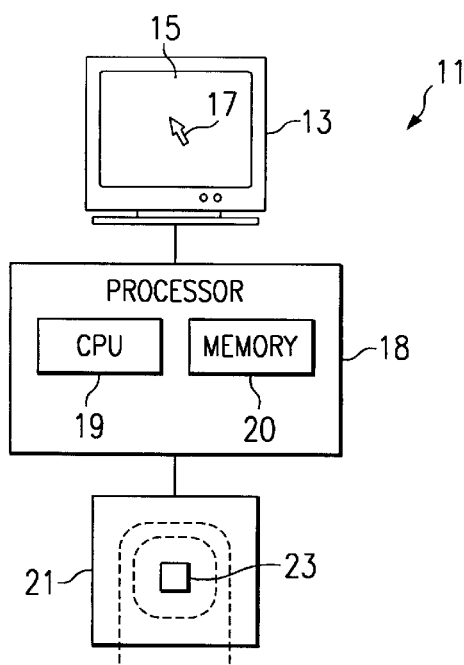
FIG. 1 is a block diagram of a system according to the present invention.

Referring now to the drawings, and first to FIG. 1, a system according to the present invention is designated generally by the numeral 11. System 11 includes a display 13, which includes a screen 15. A pointer 17 is shown displayed on screen 15. Display 13 may be, for example, a standard CRT computer monitor. Alternatively, screen 13 may operate on any of several non-CRT technologies used in laptop and notebook computers. System 11 also includes a processor 18 that includes a central processing unit (CPU) 19 and memory 20. Preferably, CPU 19 is a microprocessor such as an Intell 166 MHZ Pentium microprocessor. Memory 20 includes a random access memory (RAM).

System 11 includes a user input device 21. In FIG. 1, user input device 21 is represented generally as a rectangle. The specific form of user input device 21 is determined by the configuration of the system. For example, the user input device may be integrated into the body of a laptop or notebook computer, or it may be part of a hand-held infrared remote control device.

User input device 21 includes a sensing element 23. As will be described in detail hereinafter, sensing element 23 senses movement of the user's thumb or finger, shown in phantom and designated by the numeral 25, to control the x-y position of pointer 17 on screen 15. As will further be described in detail hereinafter, sensing element 23 also senses the placing or lifting of a finger on sensing element 23 to provide z input to microprocessor 19. Z input may be interpreted as mouse button up and mouse button down signals.

Figure 2:
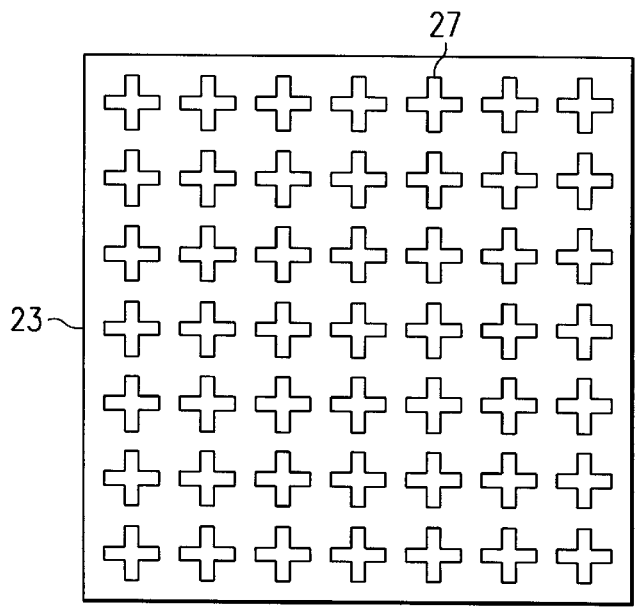
FIG. 2 is a physical plan view of a composite sensor array according to the present invention.
Figure 3:
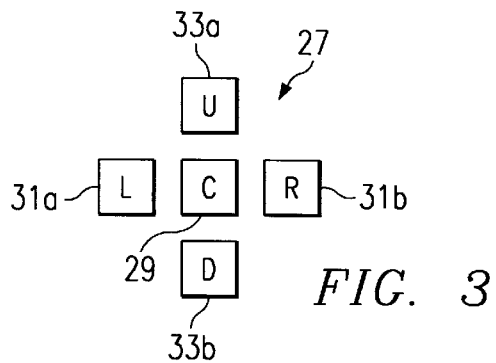
FIG. 3 is a pictorial illustration of a composite sensor according to the present invention.

Referring now to FIG. 2, there is shown an enlarged view of sensing element 23. Sensing element 23 includes an array of composite sensors 27. As shown in FIG. 3, each composite sensor 27 includes five individual sensors arranged in the shape of a cross. Referring still to FIG. 3, composite sensor 27 includes a central or trigger sensor 29, left and right sensors 31A and 31B, respectively, and up and down sensors 33A and 33B, respectively.

In the preferred embodiment, composite sensor 27 has the dimensions of about 3x3 mm and it is preferably fabricated as part of a semiconductor chip. As shown in FIG. 2, in the preferred embodiment, sensing element 23 comprises a square of 7-7 array of composite sensors 27. The individual sensors of each composite sensor 27 and the spacing therebetween is less than the width of a fingerprint ridge. Preferably, the individual sensors and their spacing from each other is on the order of about 0.5 mm.

Figure 4:
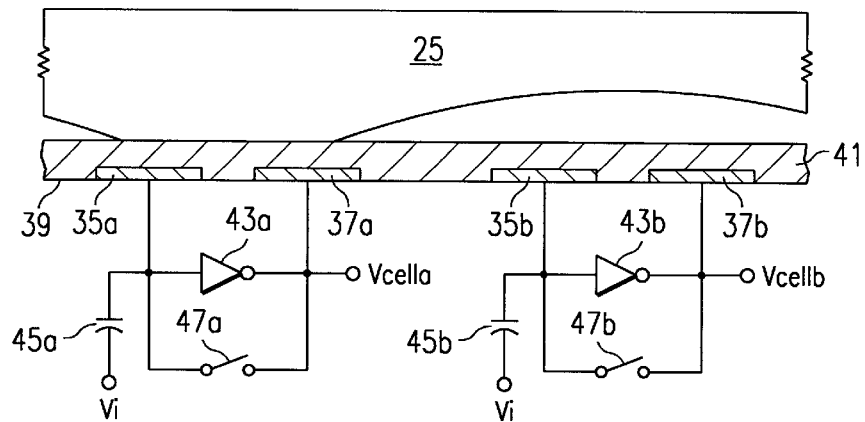
FIG. 4 illustrates the physical structure of the sensor cells and their electrical operation according to the present invention.

Referring now to FIG. 4, there is illustrated the structure and operation of the individual sensors according to the present invention. The preferred sensor of the present invention is of the type disclosed in Tartagni, U.S. patent application Ser. No. 08/799,543, filed Feb. 13, 1997, entitled "Capacitive Distance Sensor", the disclosure of which is incorporated herein by reference. Each sensor of a composite sensor 27 includes a first conductor plate 35 and a second conductor plate 37 supported on a semiconductor substrate, which is preferably a conventional silicon substrate that may have a conventional shallow epitaxial layer defining an upper surface region thereof. The top surface of the substrate includes an insulating layer 39. Insulating layer 39 is preferably an oxide layer, which may be a conventional thermally grown silicon dioxide layer. Conductor plates 35 and 37 are covered with a protective coating 41 of a hard material. Protective coating 41 protects plates 35 and 37 from abrasion, contamination, and electrostatic discharge.

Each sensor includes a high gain inverting amplifier 43. The input of inverter 43 is connected to a reference voltage through an input capacitor 45. The output of inverter 43 is connected to an output $V_{CELL}$. The input of inverter 43 is also connected to conductor plate 35 and the output of inverter 43 is also connected to conductor plate 37, thereby creating a charge integrator whose feedback capacitance is the effective capacitance between conductor plates 35 and 37.

When a finger 25 is placed on the surface of protective layer 41, the surface of the skin over each sensor acts as a third capacitor plate separated from adjacent conductor plates 35 and 37 by a dielectric layer that includes protective coating 41 and a variable thickness of air. Because fingerprint valleys will be farther from conductor plates 35 and 37 then fingerprint ridges, sensors located beneath valleys will have more distance between their conductor plates 35 and 37 and the skin surface than sensors under ridges. The thickness of this dielectric layer will modulate the capacitance coupling between plates 35 and 37 of each sensor. Accordingly, the sensors under valleys will exhibit a different effective capacitance than sensors under ridges.

The sensors of the present invention work in two phases. During the first phase, the charge integrator is reset with a switch 47 by shorting the input and output of inverter 43.

This causes inverter 43 to settle at its logical threshold. During the second phase a fixed charge is input to the charge integrator, causing an output voltage swing inversely proportional to the feedback capacitance, which is the effective capacitance between conductor plates 35 and 37. For a fixed amount of input charge, the output of inverter 43 will range between two extremes depending on the effective feedback capacitance value. The first extreme is a saturated voltage level if the effective feedback capacitance is very small. The second extreme is a voltage close to the logical threshold, which is the reset value when the effective feedback capacitance is large. Since the distance between the skin and the sensor changes the effective feedback capacitance of the charge integrator, the output of a sensor under a ridge will be different from the output of a sensor under a valley.

In the present invention, the information of interest is the motion of the pattern, and not the pattern itself. Thus, movement is sensed at a relatively small number of spaced apart locations on the surface of sensing element 23. The overall displacement is then computed by combining local information provided by the composite sensors. For each composite sensor, an output is computed at each time step. In the preferred embodiment, only low-to-high transitions are considered. For each composite sensor, the device of the present invention detects whether a ridge has passed, and in which direction. A low-to-high transition in the central sensor of a composite sensor triggers the device. Subsequent events in either the right/left or top/bottom sensors detect a movement in that direction. Simultaneous events in the left/right or top/bottom sensors are not processed. The output for each sensor is computed comparing the sensor's output variation to the average variation for the other cells of the composite sensor plus an additional offset. Comparing the output to the average compensates for common mode signals. The additional offset, which is set greater than thermal and fixed pattern noise, avoids spurious events that may be produced when the finger is not on the sensor. Noise immunity is thus increased and, provided that the image has enough contrast compared to the offsets, sensors under the ridges are properly detected.

Figure 5:
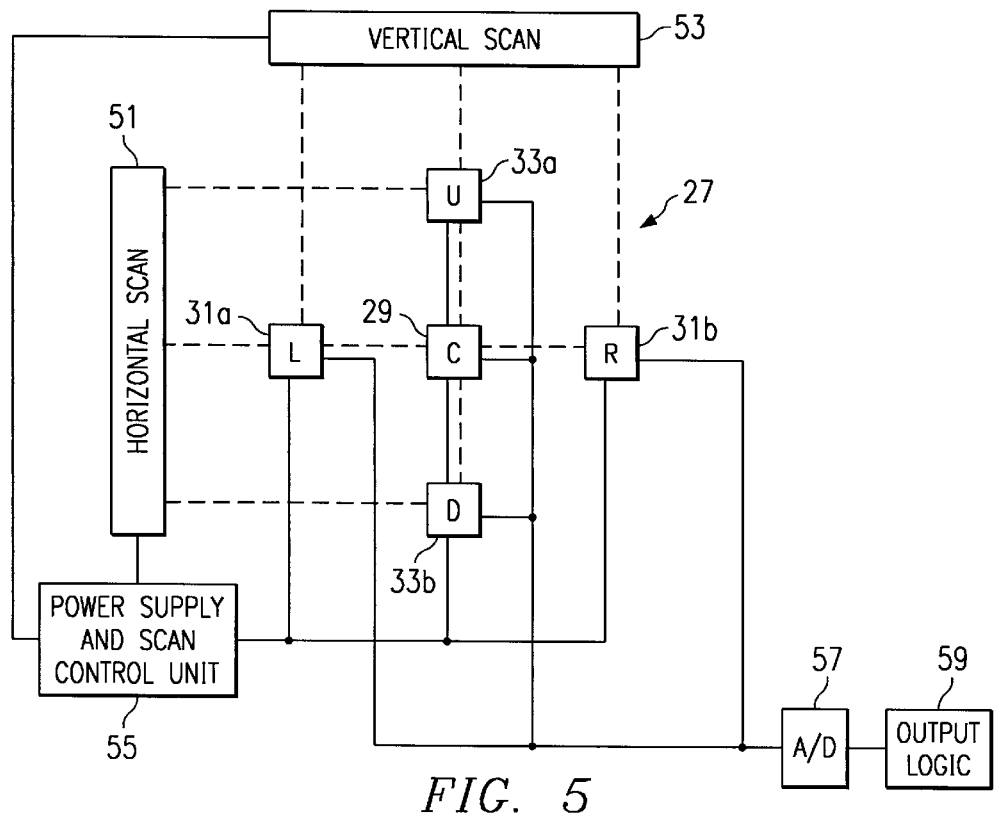
FIG. 5 is a block diagram illustrating the scanning of a composite array according to one embodiment of the present invention.

Referring now to FIG. 5, there is shown a block diagram of one embodiment of the user input device of the present invention. For purposes of illustration, only one composite sensor 27 is shown. However, in the preferred embodiment of the actual device, 49 composite sensors are included.

The device of FIG. 5 includes a horizontal scanning stage 51 and a vertical scanning stage 53. Scanning stages 51 and 53 enable one cell 29-33 at a time according to a predetermined scanning pattern. The device of FIG. 5 includes a power supply and scan control unit 55, which supplies input voltage to the cells and controls the scanning of scanning stages 51 and 53.

An analog to digital (A/D) converter 57 is connected to receive the output of each cell of the array. A/D converter 57 produces a numerical gray scale value corresponding to the voltage produced by each cell. The output of A/D converter 57 is connected to output logic 59. Output logic 59 is software that processes the digital values received from A/D converter 57 to provide pointer movement control.

Figure 6:
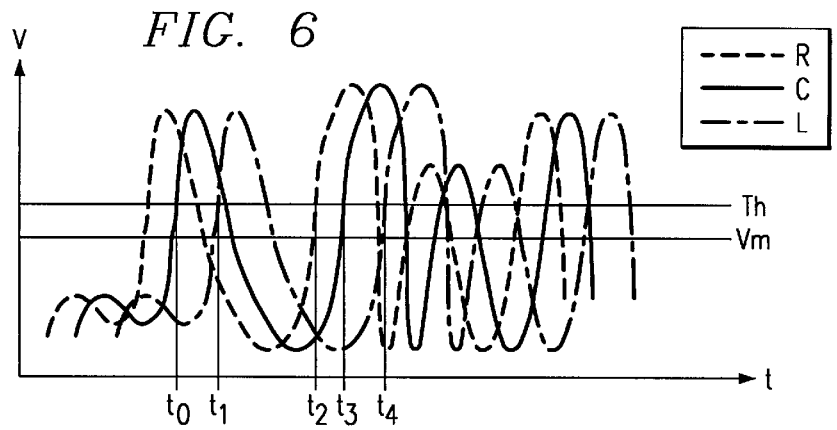
FIG. 6 is plot of voltage versus time illustrating the operation of one embodiment of the present invention.

Referring to FIG. 6, there is shown a plot of voltage vs. time illustrating the operation of the device of FIG. 5. In FIG. 6, the output of a central trigger sensor is represented by solid curve C. The output of a left sensor is represented by curve L and the output of a right sensor is designated by curve R. The output logic of the present invention includes a counter that is started whenever the output of the trigger sensor makes a transition above a threshold value indicated by horizontal line Th. The threshold value is greater than a mean value indicated by line $V_m$. In FIG. 6, curve C increases above the threshold Th at time $T_o$, which starts the counter. The counter is stopped whenever the output of the left or right sensor increases above the threshold Th. Thus, in FIG. 6, the output of left sensor, indicated by curve L increases above threshold Th at time $T_1$, thereby stopping the counter. The output logic stores the valid count values in a suitable memory. At regular intervals, or according to a suitable polling, the output logic computes a mean value of the counts stored for the x and y components of the individual displacements measured by the composite sensors.

Referring still to FIG. 6, the output of right sensor, which is illustrated by curve R, crosses threshold Th at time 2. However, since the counter is stopped by the prior crossing of the threshold by curve L at time $T_1$, no time is stored for the right crossing. At time $T_3$, the value for central trigger sensor, as represented by curve C crosses threshold Th, which again starts the counter. The counter stops when the output from left sensor, represented by curve L, crosses the threshold Th at $T_4$. It will be apparent to those skilled in the art that a similar method is used for determining the y component of displacement by the use of the up and down sensors of each composite sensor.

Figure 7:
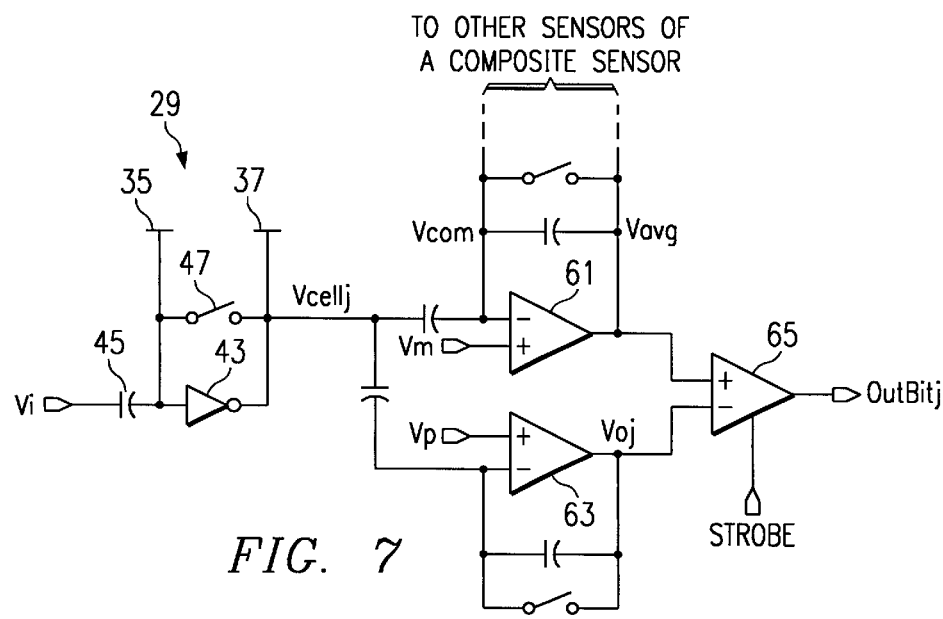
FIG. 7 the circuitry of an alternative embodiment of the present invention.
Figure 8:
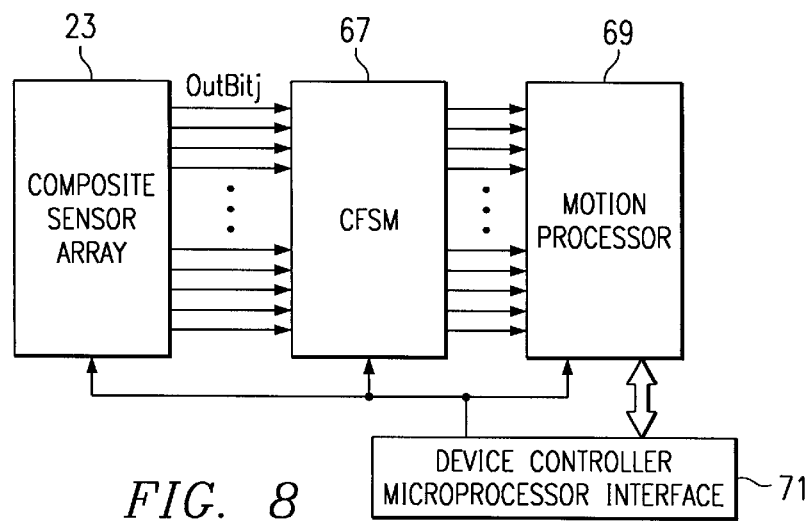
FIG. 8 is a block diagram of an alternative embodiment of the present invention.

Referring now to FIGS. 7 and 8, there is shown an alternative embodiment of the device of the present invention. In FIG. 7, there is illustrated a circuit for converting an analog output of a cell, for example, a central cell 29 to a digital output. As will be recalled from the discussion of FIG. 4, cell 29 includes a pair of plates 35 and 37 and a charge amplifier 43. When the skin approaches the surface of plates 35 and 37 it modifies the electric field over the plates, thereby reducing the effective feedback capacitance of amplifier 43. If sensor 29 is under a ridge, the output voltage variation $V_{cellj}$ associated with the input voltage step a $V_i$, occurring after reset of switch 47, is therefore greater compared to cells underneath fingerprint valleys. The circuit operates in weak inversion as to minimize power consumption.

The output $V_{cellj}$ of sensor 29 is connected to a first charge amplifier 61 and a second charge amplifier 63. Amplifiers 61 and 63 are identical to each other and each has unity gain. The outputs of all of the other sensors of a composite sensor are connected in parallel to amplifier 61. The outputs of all amplifiers 61 associated with the other sensors of the composite sensors are also connected together in parallel. The amplifiers collectively compute average output voltage $V_{avg}$.

The other charge amplifier 63 simply inverts and shifts the output of sensor 29 and yields an sensor output voltage $V_{Oj}$.

of amplifiers 61 and 63 are connected to a clocked comparator 65.

Thus, the circuit of FIG. 7 produces a binary output that indicates that a ridge has passed a sensor of a composite sensor.

Referring to FIG. 8, the outputs (OutBit$_j$) of the sensors of composite sensor array 23 are connected to a set of finite state machines (cFSM) 67. A finite state machine is associated with each composite sensor. The finite state machine is set when the OutBit$_j$ for the central sensor C of a composite sensor is high. When the OutBit$_j$ for a left/right or up/down sensor goes high while the finite state machine is set, the finite state machine reports digital motion value to a motion processor 69, which collects and aggregates the digital motion values for all of the finite state machines. At each time step, which in the preferred embodiment 32.5 microseconds, each finite state machine reports, independently for x and y, a digital value that is either 0, +1, or −1. Motion processor 69 sums the reported values over x and y. The net direction of movement is indicated by the sign of the sum; a positive sign indicates movement in the positive x or y direction, and a negative sign indicates movement in the negative x or y direction. A sum of zero indicates no movement. Motion processor provides motion information to a microprocessor interface to control the position of the pointer on the screen. Motion processor 69 may accumulate the displacement calculated at each time step until the external microprocessor 18 polls the device.

The outputs (OutBit$_j$) of the composite sensor may also be used to detect if a finger is present on sensing element 23. If the sum of the outputs is greater than a minimum N$_{min}$, a finger valid signal is asserted. Preferably, N$_{min}$ is set at about 10% N, where N is the total number of composite sensors. The finger valid signal allows a mouse click to be implemented without a button.

Summing over all the composite sensors provides cross-redundancy to helps attenuate the effects of ridge roughness, skin elasticity, and friction, which can cause a false value for a particular composite sensor. The circuit of FIG. 7 performs the digital computation very quickly, which allows time-multiplexing of the analog and digital operations, thereby avoiding substrate coupling effects.

From the foregoing, it may be seen that the present invention overcomes the shortcomings of the prior art.

The present invention is implemented with a small low-cost sensor array. The small number of sensors eliminates the timing problems associated with scanning a large array. Processing according to the present invention may be implemented in hardware or relatively simple software rather than in the complex image processing of the prior art.

What is claimed is:

1. A user input device, which comprises:
    an array of composite sensors;
    means for detecting motion of a fingerprint feature at each composite sensor of said array; and
    means for moving a pointer on a display based upon said detected motion of each said fingerprint feature, wherein each composite sensor of said array includes:
        a central trigger sensor;
        a pair of X-direction sensors positioned on opposite sides of said central sensor; and
        pair of Y-direction sensors positioned on opposite sides of said central sensor.

2. The user input device as claimed in claim 1, wherein each sensor of said composite sensor is adapted to produce a voltage indicative of the presence of a fingerprint feature in proximity thereto.

3. The user input device as claimed in claim 2, wherein a first voltage indicates the presence of a first fingerprint feature and a second voltage indicates the presence of a second fingerprint feature.

4. The user input device as claimed in claim 3, wherein said first fingerprint feature is a valley and said second fingerprint feature is a ridge.

5. The user input device as claimed in claim 3, wherein said means for detecting movement of a fingerprint feature includes:
    means for detecting a transition from said first voltage to said second voltage at said central sensor;
    means for detecting a transition from said first voltage to said second voltage at one of the other sensors of said composite sensor after detection of said transition at said central sensor; and
    means for producing a direction of motion signal based upon the position of said other sensor in relation to said central sensor.

6. The user input device as claimed in claim 5, wherein said direction of motion signal is a number having a positive sign if said motion is in a first direction and a negative sign if said motion is in a second direction opposite said first direction.

7. The user input device as claimed in claim 6, wherein said means for moving said pointer includes means for summing said direction of motion signals.

8. The user input device as claimed in claim 1, wherein each sensor of each composite sensor of said array comprises a pair of conductor plates supported on a common semiconductor substrate.

9. The user input device as claimed in claim 1, wherein each sensor of each composite sensor of said array comprises a pair of conductor plates within a semiconductor substrate, and wherein said means for detecting motion of a fingerprint feature comprises a plurality of circuits for each composite sensor of said array, such that said conductor plates of each sensor of each composite sensor of said array is connected to a respective circuit, said respective circuit being adapted to produce a voltage indicative of the presence of a fingerprint feature within an electric field produced between said conductor plates of its respective sensor.

10. The user input device of claim 9, wherein each of said respective circuits comprises:
    an input capacitor;
    a switch; and
    an inverting amplifier.

11. The user input device of claim 9, wherein said means for moving a pointer on a display comprises a processor.

12. The user input device of claim 11, wherein said processor comprises a central processing unit and memory.

13. The user input device of claim 1, wherein each composite sensors of said array is cross-shaped.

14. The user input device of claim 1, wherein said means for detecting motion of a fingerprint feature comprises:
    a power supply and scan control unit,
    an X-direction scanning stage,
    a Y-direction scanning stage, and
    an analog-to-digital converter.

15. The user input device of claim 14, wherein said means for moving a pointer on a display comprises output logic.

* * * * *